May 3, 1927.　　　　　　　　　　　　　　　　　　　　1,626,878
C. R. SEYMOUR
TUBE CUTTING MACHINE
Filed Aug. 30, 1923　　　　　7 Sheets-Sheet 2

INVENTOR.
BY
ATTORNEY.

May 3, 1927.

C. R. SEYMOUR 1,626,878

TUBE CUTTING MACHINE

Filed Aug. 30, 1923

INVENTOR.

BY

ATTORNEY.

May 3, 1927.  
C. R. SEYMOUR  
TUBE CUTTING MACHINE  
Filed Aug. 30, 1923  
1,626,878  
7 Sheets-Sheet 6

INVENTOR.
Chas. R. Seymour
BY
Chas. F. Dane
ATTORNEY.

May 3, 1927.

C. R. SEYMOUR

TUBE CUTTING MACHINE

Filed Aug. 30, 1923

INVENTOR.

BY

ATTORNEY.

Patented May 3, 1927.

1,626,878

UNITED STATES PATENT OFFICE.

CHARLES R. SEYMOUR, OF ROCHESTER, NEW YORK, ASSIGNOR TO M. D. KNOWLTON COMPANY, OF ROCHESTER, NEW YORK, A CORPORATION OF NEW YORK.

TUBE-CUTTING MACHINE.

Application filed August 30, 1923. Serial No. 660,154.

This invention relates to mechanism for cutting long lengths of tubing, formed of paper or like material, into short sections, and it is particularly designed to be employed with a known forming machine which constantly delivers the tubing in a continuous length. The purpose of this association is to utilize the forced delivery from the forming machine to feed the tubing through the cutting mechanism and the latter will be described as so adapted. While the cutting mechanism is primarily designed for such an adaptation, yet other means may be employed for feeding the tubing through said mechanism.

In the association of the present cutting mechanism with such a forming machine, it is essential that the delivered tubing be guided into the cutting mechanism with its axis coinciding with the axis of operations in said mechanism. One of the objects of the present invention therefore is to provide a series of flexible guides which can be relatively adjusted to the diameter of the tubing and to center the tubing to cause it to follow the line of operations and which are mounted on a common supporting head that is adjustable on the machine so that the guides can be positioned as a whole relatively to the cutting mechanism.

The cutting mechanism performs a cycle of operations in which the constantly driven saw is first thrown into engagement with the travelling tubing, then propelled to travel with the advancing tubing until the tube section is severed, then withdrawn from the path of travel of the tubing and, finally, is returned to its initial position, ready for another cutting operation. Another object of the present invention therefore is to provide a simple and efficient means whereby these operations are performed in their sequential order, which means preferably will include a tripping mechanism whereby the cycle of operations is started by the impact of the end of the travelling tubing on a controlling element, this tripping mechanism returning to its normal position when the end section of the tubing is severed.

Other objects and advantages of the invention will be pointed out in the following detailed description of the same.

In the drawings, in which similar reference characters designate corresponding parts,—

The present tube-cutting machine is designed to co-operate with a known machine, not shown, for winding spiral tubing, and in the joint operation of the two the cutting machine is placed at the delivery end of the winding machine so that the line of travel of the tubing from the winding machine will coincide with the axis of operations in the cutting machine and the feed of the tubing in the winding machine will carry it through the cutting machine.

The supporting frame of the present machine is generally rectangular in form and comprises the base 2, the ends 3, 4 and the girder 5 extending between said ends near their upper part. Extending across the top of the frame is a bar 6, rectangular in cross-section, on which certain parts of the machine are mounted. This bar is secured to the top of the frame ends with blocks 7 interposed, the cross-area of which blocks is less than that of the bar 6. These several members are rigidly secured together in the manner usually employed in machine construction.

Figure 1:
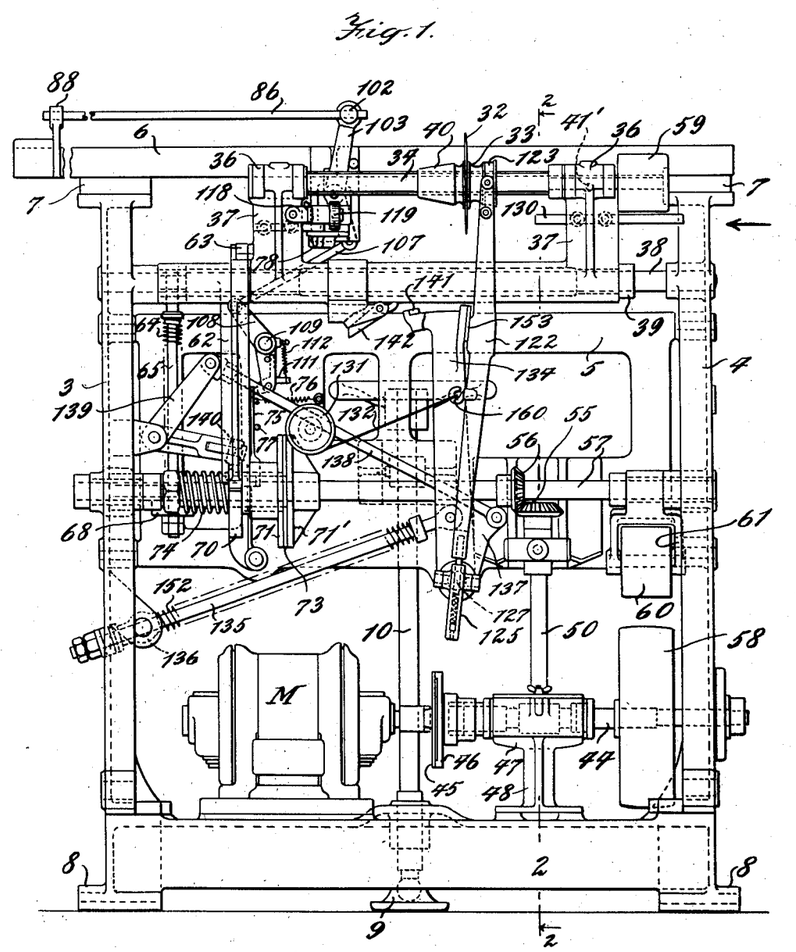
Figure 1 is a side elevation of a tube cutting machine embodying the invention, with the tripping and tube-guiding mechanism removed.
Figure 2:
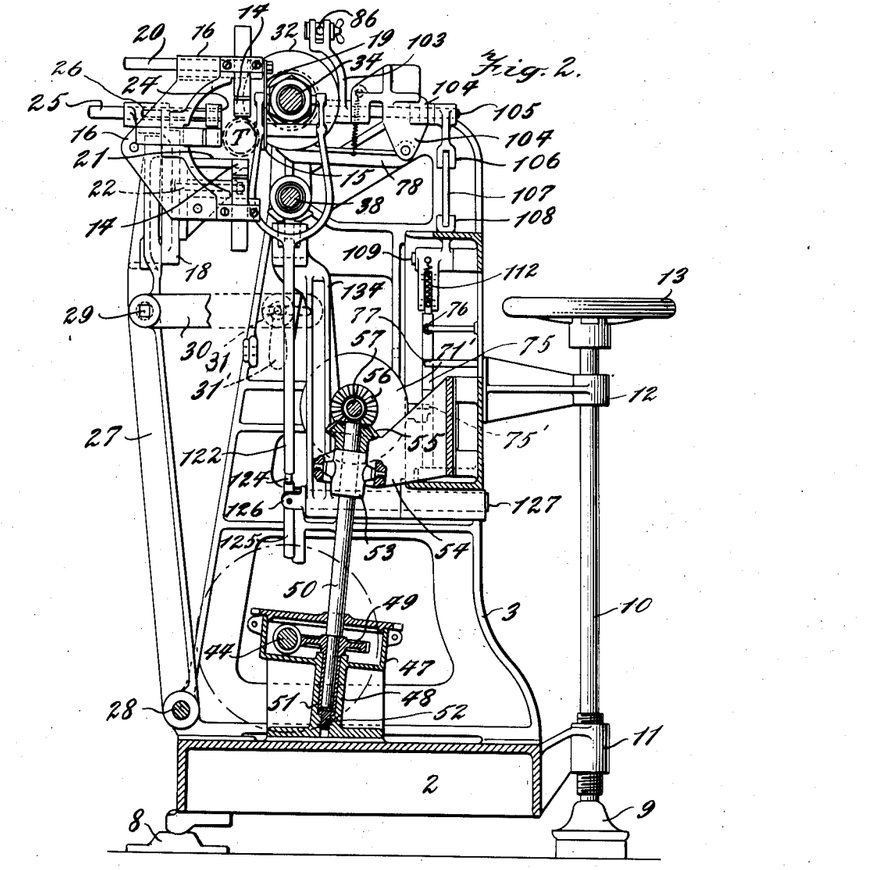
Fig. 2 is a vertical cross-section on the line 2—2 of Fig. 1.

The machine as a whole is adjustable on the supporting floor and to that end it has fulcrum shoes 8 at the two front corners, as shown in Figs. 1 and 2, and a swivel shoe 9 at the rear in an intermediate position. The swivel shoe 9 is carried by a rod 10 which is threaded at its lower end in a bracket 11 secured to the base 2 and journaled at its upper end in a bracket 12 projecting from the rear part of the machine frame. On the upper end of the rod is an operating hand-wheel 13. By turning the rod in one direction or the other with the swivel shoe bearing on the floor, the machine can be tilted on its fulcrum shoes 8 to provide a transverse angular adjustment that may be employed in alining the cutting machine with the winding machine.

Figure 4:
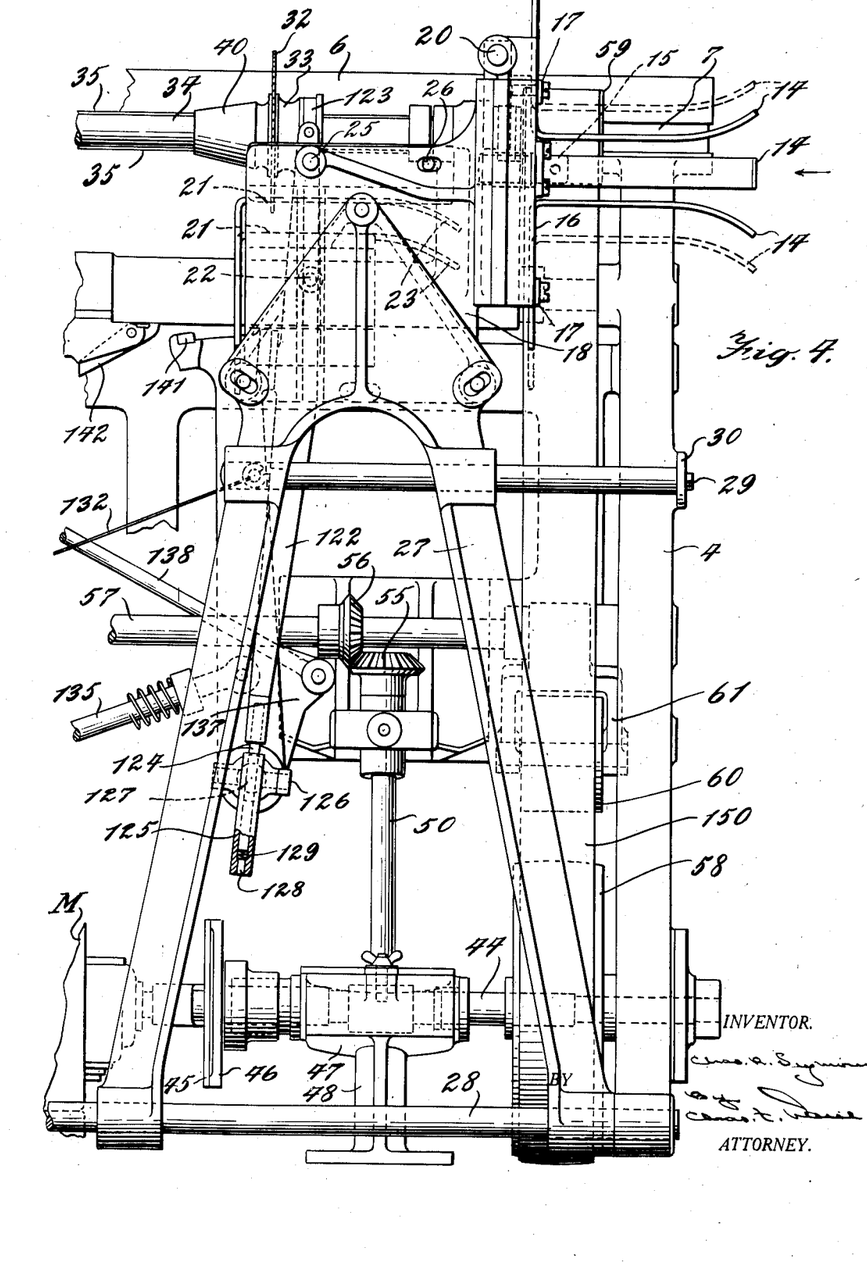
Fig. 4 is an enlarged detail view, showing a side elevation of the guide mechanism for centering the tubing as the latter enters the cutting machine.

The rotating tubing enters the cutting machine on the line indicated by the arrows at the upper right-hand corners of Figs. 1 and 4, and at T in Fig. 2. As the tubing enters the machine it is engaged by the flexible guides 14 and 15 (Figs. 2 and 4). The guides 14 are three in number, upper, lower and one on the left, as shown in Fig. 2. These have their inner ends bent at right angles and clamped to a bracket 16 by plates 17 having screws passing through their ends into said bracket, which latter is bolted to a supporting head 18. By loosening the clamping plates 17 the guides can be adjusted on the bracket. The guide 15 on the right, as shown in Fig. 2, is attached to the lower end of a flexible arm 19 which is carried by a rod 20 slidably supported in the bracket 16 for horizontal adjustment in a direction transversely of the tube. These guides 14 and 15 furnish four flexible points of contact with the tube and serve to hold the latter in position as it is led to the saw as described hereinafter. By a proper adjustment of these guides the line of travel of the tubing can be controlled and tubing of different diameters can be accommodated; the flexibility of the guides permitting them to accommodate any unevenness or irregularity in the wall of the tubing.

Back of the flexible guides 14 and 15 is a shelf 21 (Figs. 2, 4 and 12) vertically adjustable on the supporting head or frame 18 by a bolt 22, and having thereon a plate 23 extending forward from the same with a slight downward curve. This shelf and plate receive the tubing from the flexible guides and serve to support the same during the sawing operation, the curved forward end of the plate 23 permitting the end of the approaching tubing to ride easily onto the shelf. In Fig. 4 two adjustments of the shelf are indicated by dotted lines and an adjustment of the upper and lower flexible guides 14 is similarly indicated. Cooperating with the shelf 21 is a gauge or stop 24 to hold the tubing against the lateral pressure of the saw during the sawing operation, the tubing resting on the shelf and against said gauge. This gauge is carried at its ends by rods 25 and 26 extending through the frame 18 to permit an adjustment of the gauge relative to the path of travel of the tubing.

The bracket 16 carrying the flexible guides may be secured in any suitable manner to the head or frame 18 and the latter is attached to the upper end of an auxiliary frame 27 (Figs. 2 and 4) which is pivoted at its lower end on a rod 28 in the lower front part of the main machine frame. In the upper part of this pivoted frame is secured a rod 29 which extends at one end beyond the main frame end 4 and is adjustably connected with the latter by a link 30, a screw 31 on the frame extending through a slot in the link and engaged by a handled nut 31' providing such adjustment. By means of this pivoted frame 27 the flexible guides, shelf, stops and gauges carried at the upper end thereof can be adjusted as a whole relatively to the required lines of travel of the tubing through the machine and by clamping the link 30 to the frame end the said pivoted frame can be secured in adjustment.

The saw 32 (Figs. 1 and 9) is carried by a sleeve 33 splined on a mandrel 34, there being two splines 35 on opposite sides of the mandrel to balance the same. Said mandrel is journaled at its ends in the opposite bearings 36 of a yoke 37, the usual bushings and collars being provided in the bearings to prevent longitudinal movement of the mandrel in the yoke. The intermediate part of the yoke provides a tubular bearing which is journaled on a shaft 38 secured between the frame ends 3 and 4. On the shaft 38 adjacent to the frame end 4 is fixed a collar 39 to prevent longitudinal movement of the yoke in that direction. The sleeve 33 carrying the saw has a cone 40 at one end and an annular groove in the other end, the purpose of which will be explained further on.

The saw 32 is normally held away from the line of travel of the tubing by a spring 41 (Fig. 8) under tension. This spring is attached at one end to an arm of the yoke 37, as at 41', Fig. 1, and at the other end to a bolt 42 carried by a bracket 43 secured to the under side of the bar 6. By turning the nut on the bolt 42 the tension of the spring can be adjusted.

Means are provided for rotating the saw and for driving other parts of the mechanism. On the base frame member 2 is mounted a motor M (Figs. 1 and 4) having a flexible driving connection with the shaft 44. This flexible connection is formed by two clutch members 45 and 46 engaging an interposed disc $d$, of leather or like material, the member 45 being attached to the motor shaft and the member 46 to the shaft 44. This latter shaft passes through an oil casing 47 carried by a support 48 mounted on frame base member 2. That part of the shaft 44 within the oil casing 47 is provided with a worm (Fig. 2) which engages a wheel 49 fixed on a vertical shaft 50 extending upwardly through the casing. The lower end of the shaft 50 is stepped in a bearing 51 formed in the post 48 with an interposed bushing resting on a flanged plug 52 seated in an opening in the lower end of the step. Said plug closes the opening to prevent escape of the oil therethrough and forms a replaceable bearing for the shaft. When it is desired to replace the bushing or plug they can be removed by an implement driven through the opening against the lower end of the plug.

The upper part of the shaft 50 (Fig. 2) is journaled in a bearing 53 carried by a bracket 54 attached to the machine frame. On the upper end of said shaft is fixed a bevel gear 55 meshing with a similar gear 56 keyed on a shaft 57 journaled at its ends in the opposite frame ends 3, 4 (Fig. 1). Through the intervening mechanism the shaft 57 is constantly driven by the motor and its particular purpose will be explained further on.

Motion is transmitted from the shaft 44 to the saw mandrel 35 by a belt 150 (Figs. 1 and 4) carried by a pulley 58 on said shaft and a pulley 59 on the mandrel. This belt is held taut by the pressure of a roll 60 carried by a forked arm 61 hinged on the shaft 57, pressure being applied to the arm by a spring not shown.

Figures 5, 6:
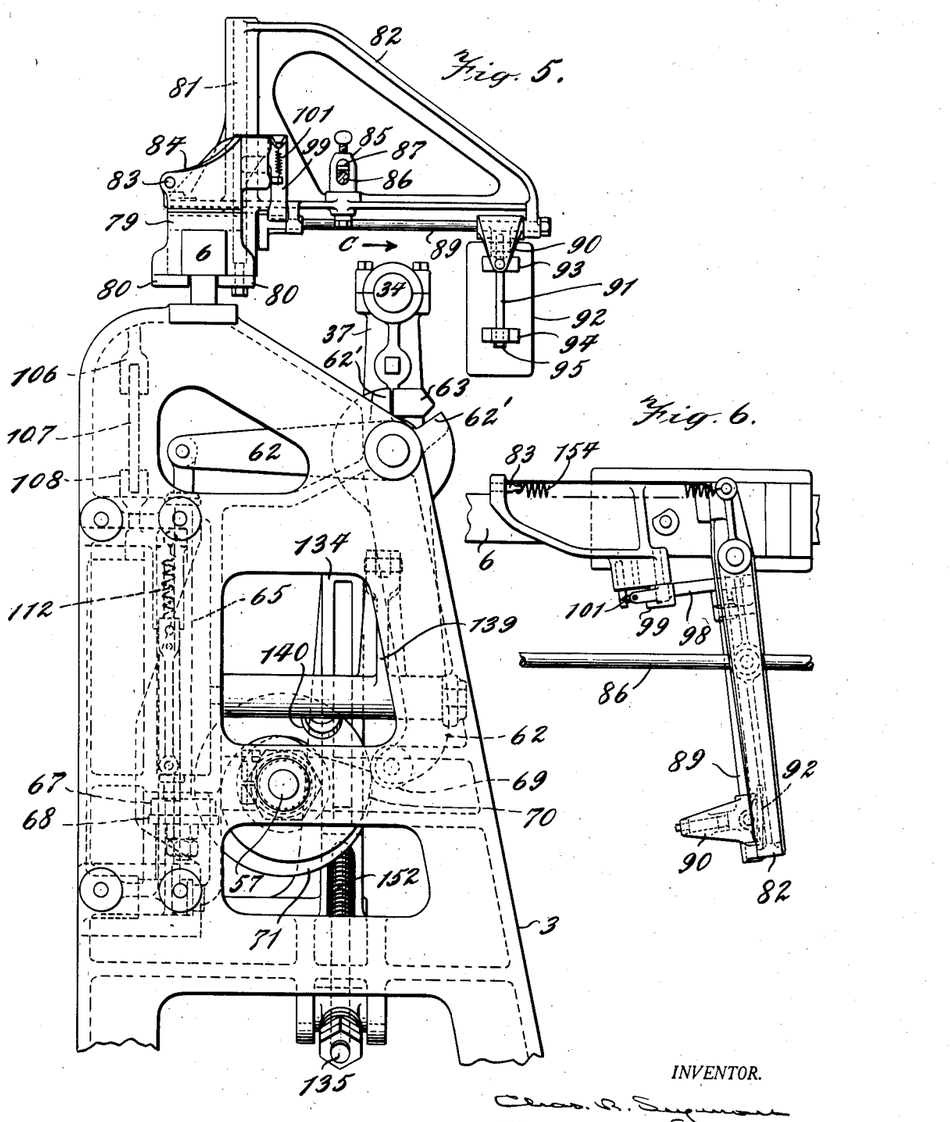
Fig. 5 is an end elevation of the machine, viewing the same from the left as shown in Fig. 1.
Fig. 6 is a detail view, showing a plan of a pivoted frame and its connections forming part of the tripping mechanism.

Mechanism is provided for moving the saw-carrying yoke at a proper time in the operation of the machine to position the saw for a cutting operation. Pivoted on the shaft 38 between the yoke 37 and the frame end 3 is an angular lever 62 (Figs. 1, 5, 7 and 9) with approximately horizontal and vertical arms. At the bend of the lever, where it is journaled on the shaft 38, is a sleeve or hub that is cut away to form two opposite jaws 62' for engaging an interposed stop projection 63 on the yoke 37. The space between the jaws is slightly greater than the width of the stop so that the latter has some play therebetween. With the angular lever in its normal position, as shown in Fig. 5, the spring 41 (Fig. 8) holds the yoke so that the stop 63 bears against the jaw 62' to the left, as shown in said figure, and the yoke is held in an upright position with the saw away from the travel of the tubing. A clock-wise turning of the hub will likewise turn the yoke, as indicated by the arrow C, against the pull of the spring 41, and thereby throw the saw of the spring 41 into the travel of the tubing. The jaw 62' to the right is a safety factor. Under ordinary conditions it will not contact with the stop 63, but should there be an excessive throw of the yoke from any cause or should the spring 41 fail, the jaw on the right would engage the stop and limit the movement of the saw toward the travel of the tubing.

An angular lever 62 is caused to actuate the yoke by the pressure of a coiled spring 64 (Figs. 1, 7, and 9) compressed on a vertical rod 65 which is hinged at its upper end to the horizontal arm of the lever and at its lower end passes through a guide lug on the frame end 3. This spring is compressed between the guide lug and a collar 66 on the upper end of the rod and normally tends to move the rod upward to lift the outer end of the horizontal arm of the lever. The upward movement of the rod is limited by a stop, formed by a rubber washer 67 and disc 68 held on its lower end by nuts, striking the guide lug, the rubber washer acting as a cushion to absorb the jar caused by the stopping of the rod. The upward movement of the rod is limited so that the angular displacement of the lever 62 will turn its hub just enough to move the yoke to a position to bring the supported saw into the travel of the tubing.

Figures 7, 9:
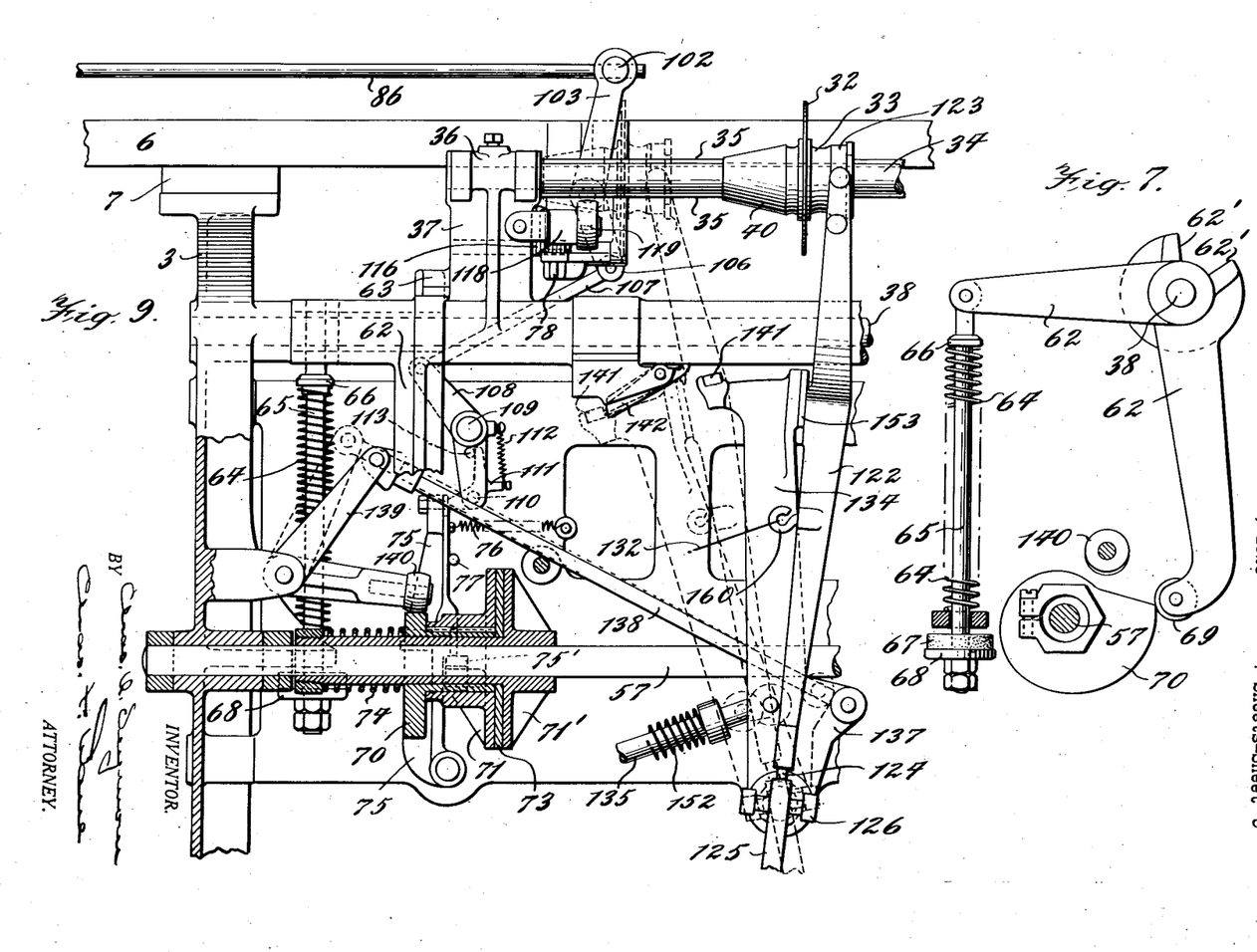
Fig. 7 is a detail view showing the angular lever and its operating means for moving the saw to and from the path of travel of the tubing.
Fig. 9 is an enlarged detail view, partly in section and broken away in parts, of the mechanism controlling the movements of the saw.

The actuation of the angular lever 62 by the spring 64 is controlled by mechanism operating on the end of the vertical arm of the lever. On the lower end of this vertical arm is a friction roll 69 adapted to be engaged by a cam 70 (Figs. 1, 5, 7 and 9) carried by the shaft 57 which is driven constantly by the motor as hereinbefore explained. This cam 70, as best shown in Fig. 9, is rotatable on the hub sleeve of a clutch member 71' keyed on the shaft 57 and has a hub extension projecting in and keyed to a like extension of a loose clutch member 71. Interposed between the clutch members 71 and 71' is a fibre disc 73. A spring 74 on the hub sleeve of the member 71' is compressed between a nut on said sleeve and the cam 70. The pressure exerted by this spring clamps the two members 71 and 71' upon the friction disc and if other provision were not made the clutch members and the cam 70 would rotate with the shaft. But the member 71 is held by a lever 75 against rotation, the lever being notched to engage a block 75' on the adjacent side of the member 71, as shown by dotted lines in Figs. 2 and 9. The lever 75 is normally held by a spring 76 to engage the member 71. At timed intervals, however, the lever is moved to disengage the clutch member 71 so that the latter can turn with the member 71' with a consequent rotation of the cam 70, but the disengagement is only momentary and the lever is returned by the spring 76 to again engage the block on the member 71 and stop rotation of the cam when the latter turns to its initial position. In consequence of this the cam only makes one complete revolution at each release of the clutch mechanism. While the clutch member 71 is held by the lever 75 the other member 71' turns with the shaft 57 but to prevent undue wear on the fibre disc 73 the compression of the spring 74 is such as to transmit only sufficient drive from the shaft to the cam for the latter to perform its function when the member 71 is released from the lever 75. The movement of the lever due to the pull of the spring 76 is limited by a stop-pin 77 and when the lever is in contact with this pin it is in position to engage the member 71.

The cam 70 is shown in its initial position in Figs. 5 and 7, that is, in its stopped position with the lever 75 engaging the clutch member 71. When this clutch member 71 is released, the cam is rotated clock-wise and the vertical arm of the lever 62 is released and this permits the spring 64, acting on the rod 65, to raise the outer end of the horizontal arm of the lever, which angularly displaces the lever as a whole and, through the engagement of one of the jaws 62' on the lever hub with the stop 63 on the yoke 37, the latter is moved against the pull of the spring 41 to throw the saw into the travel of the tubing, as has been previously explained. When the saw is so moved the yoke is engaged by a latch 78 (Fig. 3) and held in contact with the tubing until the cut is completed and the latch released by means hereinafter described. As the cam 70 continues to rotate it bears on the lower end of the vertical arm of the angular lever 62 and moves the lever as a whole to release the saw yoke so that the latter can be returned by the spring 41 to its original position when released by the latch 78. This movement of the lever also compresses the spring 64 and as the cam completes its revolution it is stopped again in its initial position by the engagement of the lever 75 with the clutch member 71.

Figure 10:
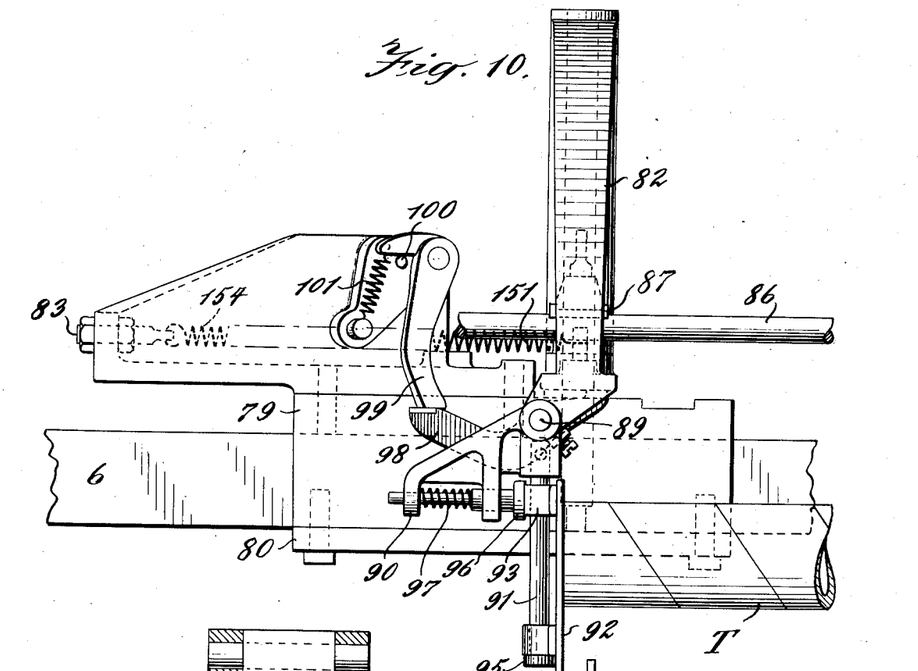
Fig. 10 is an enlarged detail view showing in side elevation a carriage and frame pivoted thereon forming part of the tripping mechanism.
Figure 11:
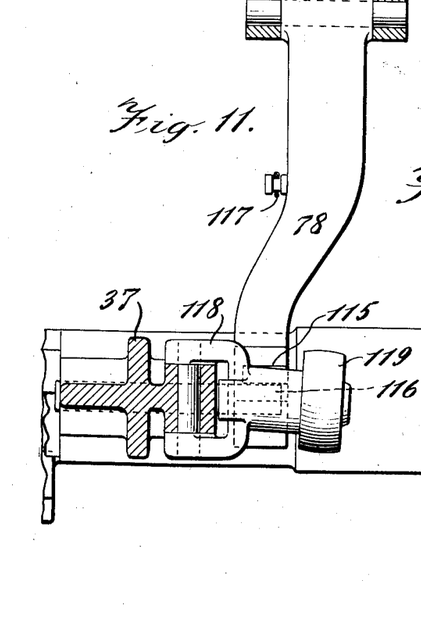
Fig. 11 is an enlarged detail view showing a plan of the catch for holding the yoke with the saw in tube cutting position.

A timing mechanism is provided for operating the lever 75 to release the clutch member 71 in its sequential order in the cycle of operations of the different mechanisms. Referring particularly to Figs. 5, 6 and 10, on the bar 6 secured on the frame ends 3 and 4 is adjustably mounted a carriage 79 adjacent to the frame end 3. This carriage is shaped to straddle the bar and slide thereon. To the under side of the carriage are bolted clamping plates 80 which project beneath the bar to hold the carriage thereon. The carriage is secured in its adjustment on the bar by a set-screw (not shown) passing through the carriage and impinging on the bar. Pivoted on this carriage by a vertical stud 81 is a frame 82 extending over the saw arbor and carrying at its free end a clutch tripping member to be presently referred to. Connecting the inner end of this frame with a bolt 83 adjustable in an abutment on an extension 84 of the carriage, is a spring 154 under tension. By adjusting the bolt the tension of this spring can be regulated (Figs. 6 and 10). The pull of the spring normally turns the outer end of the frame slightly toward the direction from which the tubing approaches. Extending through a swivel block 85 on the frame for connection with the latter is one end of a rod 86, a gib 87 being provided for clamping the rod in the block. This rod 86 extends approximately parallel with the bar 6 and is slidable in a guide bracket 88 on said bar (Fig. 1), the rear end of the rod having connection with a part of the clutch control mechanism to be hereinafter referred to.

Journaled on the under side of the pivoted frame 82 is a shaft 89 having an arm 90 fixed thereon adjacent its outer end. Secured in a socket on this arm is a spindle 91 (Fig. 10) that is normally vertical. On this spindle bearing lugs 93 and 94 journaled on said spindle, the latter having a head 95 at its lower end to retain the plate in place. The normal position of this trip plate is in the path of travel of the tubing and at right angles to the same, so that its face will be engaged by the approaching end of the tubing, as shown in Fig. 10. The moving tube bearing on this plate turns the frame 82 on its pivot 81, and this movement of the frame, which is through an arc of about 15°, moves the rod 86 longitudinally for a purpose that will be explained further on. During the swinging movement of the frame the plate 92 turns on the spindle 91 to maintain a flat contact between the plate and the abutting end of the tube. The back of the upper bearing lug 93 is flat and bears on the flat head of a plunger 96 (Fig. 10) movable in the arm 90 against the action of a spring 97 under slight compression. When the pressure of the tube abutting on the plate is removed the plunger under the action of its spring returns the plate to its normal position.

With the frame 82 in its normal position and before it has been turned on its pivot 81 by the tubing pressing on the plate 92, an arm 98 (Fig. 10) on the inner end of the shaft 89 is engaged by a spring pressed pawl 99 pivoted to the upper part of the carriage 79. This engagement continues during the turning movement of the frame and the rotation of the shaft 89 carrying the plate 92 is thereby prevented. When the frame reaches the limit of its turning movement as caused by the advancing tubing, the arm 98 passes from beneath the pawl 99 and the shaft 89 is thereby freed so that it can rotate. When this happens the plate 92 is turned upward by the abutting end of the tubing and the latter passes beneath the plate, the latter thus resting on the tubing. When the plate is freed from the tubing—the saw acts at this time to cut off the end section—the frame 82 is also released from the propelling force of the tubing and through action of the spring 151 the frame is returned to its original position. As the plate 92 is turned upward by the tubing passing thereunder, the arm 98 is also thereby turned upward to an almost vertical position, and when the freed plate drops again to the normal vertical position, the arm 98 is returned to its horizontal position. During the return movement of the arm 98 the pawl 99 is moved aside by the arm and when the latter comes to its horizontal position the pawl is moved by its spring 101 to engage the arm again. A stop-pin 100, co-operating with the spring 101, serves to maintain the pawl in its normal operative position.

The oscillation of the frame 82, as hereinbefore explained, reciprocates the connected rod 86 and sets in action mechanism that operates the lever 75 to free the clutch member 71. Connected with the inner end of the rod 86 by a swivel joint 102 is the upper end of a lever 103 (Figs. 1, 2 and 9) fixed at its lower end on the inner end of a horizontal shaft 105 journaled in a bracket 104 secured to the rectangular bar 6. On the outer end of the shaft 105 is fixed an arm 106 connected by a link 107 with an arm of an angular lever 108 pivoted at its angle on a pin 109 projecting from the machine frame. In the other or lower arm of the angular lever 108 is pivoted at 110 a pawl 111 normally held by a spring 112 against a stop-pin 113. With these parts in their normal position, as shown in Figs. 1 and 9, the end of the pawl engages the upper end of the lever 75 and the latter is held by the spring 76 against the stop 77. With a movement of the rod 86 toward the left, as viewed in Figs. 1 and 9, the lever 103 will be moved in the same direction and the arm 106 in the opposite direction to exert a pull on the link 107 to turn the angular lever 108 clockwise. This movement of the lever 108, through pawl 111, moves the lever 75 to the left and thereby releases the clutch member 71 so that the cam 70 will be rotated by the shaft 57 as heretofore explained. These parts will be returned to their normal positions by the rod 86, through the return movement of the frame 82 when the latter is released by the tripping mechanism.

Figure 3:
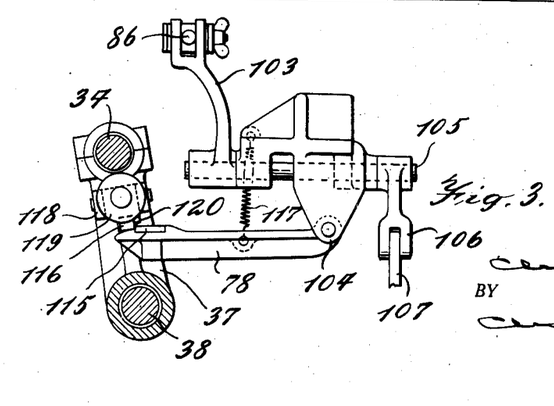
Fig. 3 is a detail view showing the latch for holding the saw arbor in position for the saw to engage the tubing.
Figure 8:
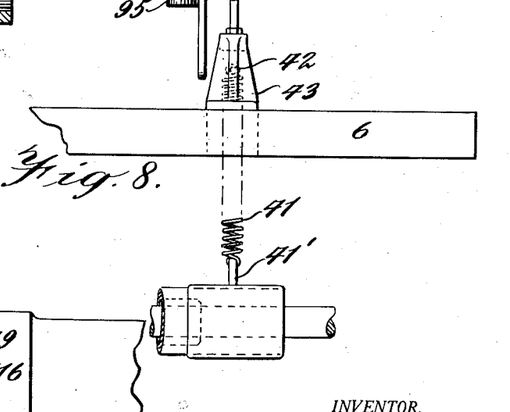
Fig. 8 is a detail view showing the spring and its connections for pulling the saw away from the path of travel of the tubing.

When the yoke 37 is moved, as heretofore explained, to throw the saw into the tubing, it is engaged by a latch 78 (Figs. 2, 3, 9 and 11) hinged to the bracket 104 and is held thereby until a tube section is severed. On the free end of the latch is a block 115 that engages a square bar 116 on the yoke when the latter is moved to the left and toward the tube, as shown in Figs. 2 and 3. The latch is held in engagement with said bar by a spring 117. When a sawing operation is completed the latch is disengaged from the bar 116 by a lever 118 pivoted at one end to the yoke and carrying a roll 119 on its free end. On the under side of this lever is a lug 120 (Fig. 3) that will contact with latch 78 when the lever 118 is depressed. When the saw completes a cutting operation the sleeve 33 will have moved to the left (Fig. 9) and the conical end 40 of the sleeve bears on the roll 119 and depresses the lever 118 so that lug 120 trips the latch 115 from the square bar 116 and the yoke is thereby freed so that it can be pulled away from the travel of the tubing by the spring 41 (Fig. 8).

During a cutting operation it is desirable that the saw travel with the feed of the rotating tubing so that the cut will be made squarely across the tubing. The movement of the saw toward the tubing is just enough for it to cut through the wall thereof and as the tubing is rotated the kerf extends around the same and its two ends should meet to give a square cut. To obtain this result means are provided for moving the saw along its mandrel during the cutting operation at the same rate of travel as the tubing.

The means employed for so moving the saw comprise a lever 122 (Figs. 1, 2, 4 and 9) pivoted at its lower end and forked at its upper end. The forked end straddles the saw yoke and between its members is pivoted a collar 123 journaled on the saw sleeve 33 in an annular groove therein, trunnions on the collar having bearings in the fork ends forming the connection. Seated in a socket in the lower end of the lever 122 is a rod 124 slidable in a sleeve 125 having opposite arms journaled in lugs 126 on the end of the bearing rod 127 (Fig. 2) journaled in the machine frame. In the lower end of the sleeve 125 is a plug 128 and between the latter and the rod 124 is a coiled spring 129 Fig. 1 balancing the load of the lever 122 so that it will not hang on the saw arbor. The trunnion connection at the lower end of the lever with the shaft 127 permits the lever to follow the travel of the saw along its mandrel and also to accommodate the transverse movement of the saw relative to the travel of the tubing when thrown into the latter by the angular displacement of the yoke. A stop 130 (Fig. 1) adjustable on an arm or yoke limits the movement of the lever 122 to the right.

In the usual cutting operation the saw is primarily carried forward on its mandrel by its engagement with the travelling tubing. Owing to the friction of bearing surfaces, inertia of connected parts and other factors, there is a tendency of the saw to lag and if provision were not made to prevent it, the movement of the tubing would be obstructed with possible deflection and the saw would make a spiral instead of a square cut across the tubing. To offset this tendency an auxiliary motor is provided to aid the tubing in the propulsion of the saw along its mandrel. This auxiliary motor 131 (Fig. 1) is mounted on the frame of the machine and comprises a spring-actuated winding drum having connection with one end of a tape 132, the other end of which latter is attached to the lever 122 at 160. The spring contained in this winding drum, indicated by dotted lines in Fig. 1, acts to normally rotate the drum in a direction to advance the lever 122 and its load so that no resistance is offered by the saw to the progress of the engaged tubing as the latter is fed through the machine. The engagement of the tubing with the saw controls the movement of the latter so that there is an equal movement of both and this insures a smooth even kerf normal to the axis of the tubing.

Means are provided for automatically returning the saw to its initial position after a cutting operation. On the bearing rod or shaft 127 (Figs. 1, 2 and 9) is pivoted the lower end of a lever 134, and to this lever, a short distance above its pivotal connection, is hinged one end of a rod 135. The other end of this rod passes through a swivel block 136 carried by a bracket in the frame end 3 (Fig. 1). On said rod 135, between the swivel and a collar on the other end of the rod, is a coiled spring 152 under compression that normally tends to move the connected lever 134 to the right, as viewed in Fig. 1. When this lever is free to act under the impulse of the spring 152, it engages at its upper end the lever 122 and, moving the latter to the right, returns the saw to its initial position. On the upper end of the lever 134 is a wear plate 153 providing the contact with the lever 122. This wear plate is of sufficient width to maintain the contact between the two levers during the transverse movement of the lever 122 due to the rocking of the saw yoke.

When lever 122 moves forward, to the left as shown in Fig. 1, under the influence of the travel of the tubing engaging the saw and the pull of the auxiliary motor 131, the lever 134 is moved in advance of the lever 122 by mechanism timed to act when such movement of the lever 122 takes place. On the lower end of the lever 134 is a short arm or lug 137, to which is pivoted one end of a rod 138, the other end of which is hinged to one of the arms of a bell-crank lever 139 pivoted at its angle to a lug on the frame 3 (Figs. 1 and 9). On the extremity of the other arm of this bell-crank is a roller 140 in a position to ride on the cam 70, previously described in connection with the mechanism for moving the saw arbor. Immediately after the point of the cam releases the vertical arm of the lever 62 and the latter, through the action of the spring 64, turns the yoke 37 to throw the saw into the tubing, the incline of the cam 70 engages the roller 140 and turns the bell-crank to pull the rod 138 and the lever 134 to the left, as indicated by dotted lines in Fig. 9. On the upper end of the lever 134 is a block 141 that forms a catch. As the lever 134 moves to the left said block rides under a pawl 142 pivoted on the hub portion of the yoke 37 so that the pawl engages the block and thereby holds this lever in advance of the lever 122. Before the lever 134 swings to the left, the yoke 37 is turned by its actuating mechanism to throw the saw into the tubing. The pawl 142 is positioned on the hub of the yoke so that when the latter is turned to throw the saw into the tubing, the pawl will be in place to engage the block 141 of the lever 134, but when the yoke is pulled back by the spring 41 to its initial position, the pawl is turned by the rotation of the yoke sleeve to free the lever 134. Before the lever 134 is released by the pawl the cam 70 has turned to release the bell-crank 139 so that there is no pull on the rod 138. Consequently, the lever 134 is free to respond to the pressure of the spring 152 and it is returned to its initial position. In its return movement the lever 134 carries the forked lever 122 with it and thereby the saw is returned to the initial position. In the return movement of the lever 122 the pull on the tape 132 unwinds the same from the spring drum 131 and rewinds the spring of the latter.

The operation of the machine is as follows: The cutting machine is positioned relatively to the machine for forming the tubing so that the axes of travel of the tubing through both machines are identical. The tubing is constantly delivered from the forming machine and this movement is utilized to feed the material through the cutting machine of the present invention.

In the forming machine a rotary movement is imparted to the tubing and, of course, this is continued in the cutting machine.

After the cutting machine has been properly positioned relatively to the machine for forming the tubing, the arm or frame 27 (Fig. 2) is adjusted to position the guiding mechanism to receive the tubing as the latter is fed forward by the forming machine. This guiding mechanism, formed by the flexible members 14 and 15, is adjusted to the diameter of the tubing and to center the latter with the axis of travel through the cutting machine. The shelf 21 is adjusted vertically and the gauge 24 is adjusted horizontally, both the shelf and gauge operating to support the tubing against the thrust of the saw during a cutting operation. The tripping mechanism (Fig. 5) that controls the operation of the yoke carrying the saw and also the lever that returns the saw to its initial position is adjusted to cut the tubing into the required lengths. This adjustment of the tripping mechanism is accomplished by loosening the clamping screw to free the carriage 79 on the rod 6 and the gib 87 is loosened to free the rod 86 from the frame 82. When this is done the carriage is adjusted and secured on the rod 6 to position the trip-plate 92 in the line of travel of the tubing to cut the desired tube-lengths. It is the position of this trip-plate that determines the lengths of the sections into which the tubing is to be cut. After these adjustments have been made the motor M is started and the machine is ready for a cutting operation.

The tubing is constantly fed in a continuous length from the forming machine to the cutting machine. The end of the tubing enters the cutting machine between the flexible guides 14 and 15 and as the tubing progresses it passes from between the flexible guides and rides on the shelf 21 against the gauge 24, the shelf and gauge serving to hold the tubing against the thrust of the saw in the cutting operation. The end of the tubing contacts with the trip-plate 92 (Fig. 5) and through it swings the frame 82 about its pivot 81. This movement of the frame 82 through the intervening connections, moves the double lever 108 (Figs. 1 and 9) to rock the lever 75 to free the clutch member 71 so that the drive of the shaft 57 will be communicated to the cam 70. The rotation of the latter frees the angular lever 62 (Figs. 5 and 7) to be actuated by the spring 64. The actuation of this lever moves the yoke 37 to throw the saw into the tubing. When the yoke is so moved, it is engaged and held by the latch 78 (Fig. 2) until a section of the tubing is cut off and until the saw travels nearly to the end of the mandrel.

The saw is constantly rotated by its belt drive and it cuts through the wall of the tubing. The throw of the yoke is limited so that the cut extends but slightly through the wall of the tubing (Fig. 2) and separation is completed by the rotation of the tubing. As the saw cuts into the tubing it is engaged and moves along with the same, the saw being easily moved along its mandrel as its load is so balanced and carried that no resistance is offered to the progress of the tubing. As the tubing is rotated on its center the cut is completed while the saw moves but a short distance along its mandrel. As the saw is relieved of its load and as the material of the tubing is quite stout, there will be no deflecting pressure on the abutting end of the tubing and the kerf will be made squarely across the tubing without any overlap and a clean separation of the tube-section will be obtained. The severed tube-section falls into a suitable receptacle provided for the purpose. As the tube-section falls the trip-plate 92, which previously rode on the unsevered tube-section, drops to its original vertical position and the parts controlled by the trip-plate are automatically set for a new sawing operation.

When the saw approaches the end of the travel on its mandrel and after a tube-section has been severed, the cone 40 on its sleeve 33 (Figs. 1, 3 and 9) depresses the lever 118 to disengage the catch 78 from the yoke 37. The latter being freed is pulled by the spring 41 (Fig. 8) away from the travel of the tubing and the new end progresses forward, clear of the saw, to engage the trip-plate 92 to start another cutting operation.

The release of the clutch member 71, previously described, transmits the drive of the shaft 57 to the cam 70 for one complete revolution of the latter. In this revolution it starts and stops at the position shown in Figs 5 and 7, the rotation being clockwise as shown in that figure. Shortly after the cam is turned to release the vertical arm of the lever 62 it engages the bell-crank 139 (Figs. 1 and 9) and actuates the same, through the intervening connections, to move the lever 134 to the left to be engaged and held by the pawl 142. It is to be noticed that this movement of the arm 134 follows immediately after the release of the angular lever 62 to throw the saw into the tubing. While the saw engages the tubing and its travel to the left is initiated before the pull of the lever 134 to the left commences, yet the comparatively quick rotation of the cam 70 moves the lever 134 in advance of the lever 122 before any appreciable pressure is exerted on the latter by the travel of the saw on its mandrel induced by its engagement with the comparatively slowly progressing tubing and the auxiliary motor 131. In this way the saw is relieved of the load of the return lever 134 in its movement with the tubing and as the lever 122 is balanced by the spring 129 (Fig. 4) at its lower end the saw is also relieved of this weight. Furthermore, the yielding pull exerted by the clock-spring mechanism 131 through the tape 132 connected with the lever 122 is sufficient to move the saw along its mandrel so that no push of the tubing is required to move the saw.

The lever 134 is held by the catch 142 until the yoke is moved to retract the saw from the path of travel of the tubing at the completion of a cutting operation. When the yoke is turned the catch frees the lever and the latter is returned to its initial position by the pressure of the spring 152, which was previously compressed by the movement of the lever to the left through the action of the bell-crank 139. In the return movement of the lever 134 it engages the lever 122 and both are moved to their initial positions. This return movement is limited by the stop 130 (Fig. 1), adjustable on an arm of the yoke, engaging the lever 122. The return of the levers 134 and 122 to their initial positions completes the cycle of operations of the several operative mechanisms and the machine is ready to make the next cut, and the cycle of operations is again started when the tubing is fed forward sufficiently for the new end thereof to strike the trip-plate 92.

It is to be observed that no force is applied by the movement of the tubing for the actuation of any of the operative parts, except to the trip-plate 92. After this plate is tripped and the cycle of operations started, the force required to actuate any of the parts is derived from the motor. In fact, the trip-plate could be moved by hand to start a cycle of operations and this would be completed without the influence of the tubing.

Figure 12:
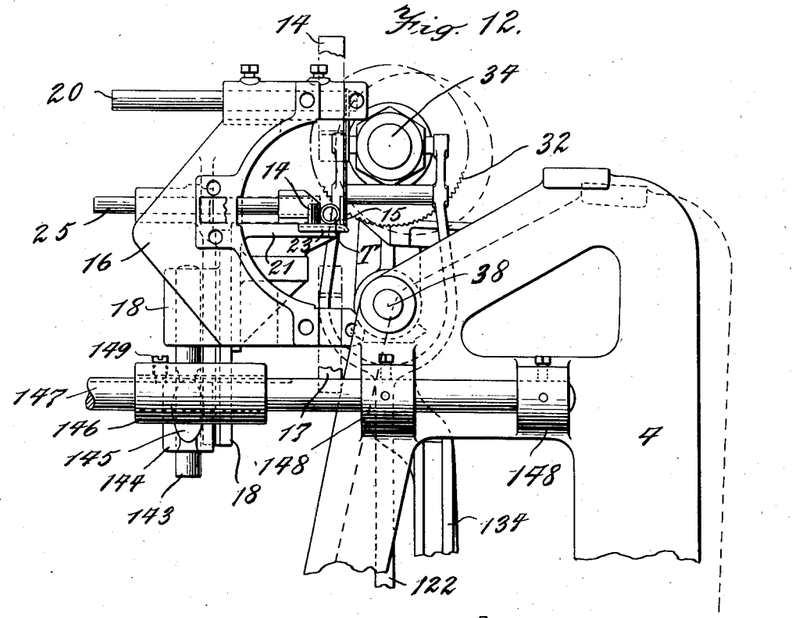
Figs. 12 and 13 are enlarged detail views showing a modification of the support for the head carrying the flexible tube guides.
Figure 13:
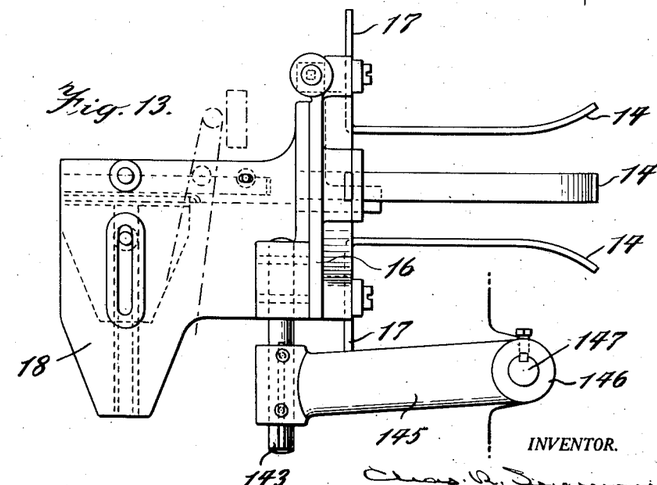

In the modification shown in Figs. 12 and 13, the head 18 carrying the flexible guides, instead of being mounted on the upper end of the pivoted frame 27 as shown in Fig. 2, is carried by a vertical pin 143 which is vertically adjustable in a sleeve 144 on one end of the arm 145, the other end of which is integral with a sleeve 146 slidable on a horizontal rod 147 held fast on lugs 148 on the frame end 4 by set-screws. The sleeve 146 is slidable on the rod 147, but is prevented from turning thereon by a set-screw 149 passing through the sleeve into a guide-way in the rod. By vertically adjusting the pin 143 in the sleeve 144, and by horizontally adjusting the sleeve 146 on the rod 147, the head can be vertically and horizontally adjusted to position the guide members carried by it relatively to the axis of operations through the machine.

What I claim is:

1. In a tube cutting machine, the combination with means for guiding a travelling tubing into the machine, of a saw mounted for transverse and parallel movements relative to the travel of the tubing, means operative to project the saw into the path of travel of the tubing, a yieldingly supported member operatively connected with the saw for movement therewith in its said transverse and parallel movements, and means independent of the tubing co-operating with said member to move the saw parallel with the tubing and without drag thereon during a cutting operation.

2. In a tube cutting machine, the combination with means for guiding a travelling tubing into the machine, of a saw mounted for transverse and parallel movements relative to the travel of the tubing, yielding means normally operating to move the saw transversely away from the travel of the tubing, mechanism operative to project the saw into the path of travel of the tubing against the action of said yielding means, and holding mechanism operative to positively maintain the saw in its projected position during a cutting operation.

3. In a tube cutting machine, the combination with means for guiding a travelling tubing into the machine, of a saw mounted for transverse and parallel movements relative to the travel of the tubing, yielding means normally operating to move the saw transversely away from the travel of the tubing, mechanism operative to project the saw into the path of travel of the tubing against the action of said yielding means, holding mechanism operative to maintain the saw in its projected position during a cutting operation, and mechanism operative to move the saw parallel with the travel of the tubing during a cutting operation.

4. In a tube cutting machine, the combination with a saw having a movable support, of a constantly driven shaft, mechanism operative to project the saw into the path of travel of the tubing, said mechanism including a clutch connection with said shaft, and a trip mechanism operable to engage the clutch members to transmit motion from the shaft to the saw-projecting mechanism.

5. In a tube cutting machine, the combination with a saw having a movable support, of a constantly driven shaft, mechanism operative to project the saw into the path of travel of the tubing, said mechanism including a clutch connection with said shaft, and mechanism controlling the clutch connection having a displaceable element operable to initiate the operation of said controlling mechanism.

6. In a tube cutting machine, the combination with a saw having a movable support, of a constantly driven shaft, mechanism operative to project the saw into the path of travel of the tubing, said mechanism including a clutch connection with said shaft, and mechanism controlling the clutch connection having a displaceable element normally positioned in the path of travel of the tubing to be displaced by the advancing end of the latter to initiate the operation of said controlling mechanism.

7. In a tube cutting machine, the combination with a saw having a movable support, of mechanism operative to project the saw into the path of travel of the tubing, means controlling the operation of the saw-projecting mechanism, and a trip mechanism comprising a swinging frame mounted for movement about a vertical axis and connected with said controlling means, and a plate attached to said frame and normally positioned to be engaged by the moving tubing to move the frame and thereby operate said controlling means to release the saw-projecting mechanism.

8. In a tube cutting machine, the combination with a saw having a movable support, of mechanism operative to project the saw into the path of travel of the tubing, means controlling the operation of the saw-projecting mechanism, a guide extending parallel with the path of travel of the tubing, a carriage adjustable on said guide, a frame mounted on said carriage for movement about a vertical axis and adjustably connected with said controlling means, and a trip-plate attached to said frame and normally positioned to be engaged by the travelling tubing to move the frame and thereby operate said controlling means to release the saw-projecting mechanism.

9. In a tube cutting machine, the combination with a saw having a pivotal support, of mechanism operative to project the saw into the path of travel of the tubing, means controlling the operation of the saw-projecting mechanism and including an actuating lever, a guide extending parallel with the path of travel of the tubing, a carriage adjustable on said guide-way, a frame mounted on said carriage for movement about a vertical axis, a rod adjustably connecting said frame with the actuating lever of said controlling means, and a trip-plate attached to said frame and normally positioned to be engaged by the travelling tubing to move the frame and reciprocate said rod to oscillate the connected lever and thereby operate said controlling means to release the saw-projecting mechanism.

10. In a tube cutting machine, the combination with a saw having a pivotal support, of mechanism operative to project the saw into the path of travel of the tubing through the machine, means controlling the operation of the saw-projecting mechanism, a swinging frame mounted for movement about a vertical axis and extending across the path of travel of the tubing and connected with said controlling means, means normally turning the outer end of the frame toward the approach of the tubing, and a trip-plate carried by said frame to be engaged by the end of an approaching tubing to turn the frame on its pivot to actuate said controlling means and release the saw-projecting mechanism, said trip-plate being freed by the disengagement therefrom of the end of the tubing.

11. In a tube cutting machine, the combination with a saw having a movable support, of mechanism operative to project the saw into the path of travel of the tubing, means controlling the operation of the saw-projecting mechanism, a pivoted frame normally extending across the path of travel of the tubing and connected with said controlling means, a horizontal shaft journaled in said frame, a trip-plate on said shaft positioned to be engaged by the end of an approaching tubing to turn the frame on its pivot and actuate said controlling means to release the saw-projecting mechanism, and a latch mechanism operating to prevent rotation of said shaft during the first part of the turning movement of the frame on its pivot, the continued turning of the frame operating the latch mechanism at a predetermined time to release the shaft and associated trip-plate.

12. In a tube cutting machine, the combination with a saw having a pivotal support, of mechanism operative to project the saw into the path of travel of the tubing, means controlling the operation of the saw-projecting mechanism, a pivoted frame extending across the path of travel of the tubing and connected with said controlling means, resilient means normally turning the outer end of the frame toward the approach of the tubing, a horizontal shaft journaled in said frame, a trip-plate angularly mounted on the outer end of said shaft and positioned to be engaged by the end of an approaching tubing to turn the frame on its pivot to actuate said controlling means and release the saw-projecting mechanism, an arm on the inner end of said shaft normally engaging a spring-pressed pawl to prevent rotation of the shaft during the first part of the turning movement of the frame, the continued turning of the frame operating at a predetermined time to release the arm from this pawl to free the shaft and associated trip-plate.

13. In a tube cutting machine, the combination with a saw having a pivotal support, of mechanism operative to project the saw into the path of travel of the tubing, means controlling the operation of the saw-projecting mechanism, a pivoted frame extending horizontally across the path of travel of the tubing and connected with said controlling means, resilient means normally turning the outer end of the frame toward the approach of the tubing, a horizontal shaft journaled in said frame, a spindle on the outer end of said shaft at right angles to the same, a trip-plate pivoted on the spindle, and mechanism operative to hold the shaft with the plate in operative position to be engaged by the end of an approaching tubing, said holding mechanism operating to hold the shaft against rotation during the first part of the turning movement of the frame on its pivot and then releasing the shaft to permit rotation of the latter by the displacement of the plate and its spindle by the travel of tubing, the displacement of the plate permitting the return of the frame to its normal position by the action of its resilient turning means.

14. In a tube cutting machine, the combination with a movable support having a mandrel journaled therein carrying a saw, of mechanism operative to move said support to project the saw into the path of travel of the tubing, said mechanism comprising a lever pivoted between its ends and engaging at an intermediate part said support, means engaging one end of the lever and normally tending to operate the same to project the saw into the path of travel of the tubing, and a trip-controlled mechanism operatively engaging the other end of said lever to control the movement of the lever.

15. In a tube cutting machine, the combination with a pivoted yoke having a mandrel journaled therein carrying a saw, of mechanism operative to move the yoke to project the saw into the path of travel of the tubing, said mechanism comprising an angular lever pivoted at its angle coaxially with and engaging said yoke, means engaging one of the arms of said lever and normally tending to operate the saw to turn the yoke and project the saw into the path of travel of the tubing, and a trip-controlled mechanism operatively engaging the other arm of said lever to control the movement of the lever.

16. In a tube cutting machine, the combination with a pivoted yoke having a mandrel journaled therein carrying a saw, and means for rotating the mandrel, of mechanism operative to move the yoke to project the saw into the path of travel of the tubing, said mechanism comprising an angular lever having a hub at its angle pivoted coaxially with and engaging said yoke, means engaging one of the arms of the lever and normally tending to operate said lever to rock the yoke and project the saw into the path of travel of the tubing, and a trip-controlled mechanism operatively engaging the other arm of the lever to control the movement of said lever.

17. In a tube cutting machine, the combination with a bearing rod mounted in the frame of the machine, of a yoke having a sleeve at an intermediate part journaled on said bearing rod, a mandrel journaled in the arms of said yoke and carrying a saw, means for driving said mandrel, an angular lever having a hub at its angle journaled on said bearing rod, said hub having a notch registering with a lug on said yoke so that angular displacement of the hub will move the yoke to project the saw into the path of travel of the tubing, means engaging one of the arms of the lever and normally tending to angularly displace said hub, and a trip-controlled mechanism operatively engaging the other arm of said lever to control the movement of the latter.

18. In a tube cutting machine, the combination with a saw having a movable support, of a lever operatively connected with the saw support, means normally tending to actuate said lever to project the saw into the path of travel of the tubing, a rotatable cam engaging said lever and normally holding the same against the action of its actuating means, means for rotating the cam to release the lever to the action of its actuating means, and a trip-mechanism controlling said cam-rotating means.

19. In a tube cutting machine, the combination with a saw having a movable support, of a lever engaging the saw support, means normally tending to actuate said lever to project the saw into the path of travel of the tubing, a constantly driven shaft, a cam on said shaft engaging said lever and normally holding the same against the action of its actuating means, a clutch with its members normally disengaged and operative to connect the shaft to the cam, and a trip-controlled mechanism operative to engage the clutch members to transmit motion from the shaft to the cam to rotate the latter and release the lever.

20. In a tube cutting machine, the combination with a pivoted yoke having a mandrel journaled therein and carrying a saw, of an angular lever pivoted at its angle coaxially with and engaging said yoke, means normally tending to actuate said lever to project the saw into the path of travel of the tubing, a rotatable cam engaging said lever and normally holding the same against the action of its actuating means, means for rotating the cam to release the engaged lever for operation by its actuating means, and a trip-mechanism controlling said cam-rotating means.

21. In a tube-cutting machine, the combination with a pivoted yoke having a mandrel journaled therein and carrying a saw, of a lever having a hub between its ends pivoted coaxially with and engaging said yoke, mechanism engaging one arm of said lever and normally tending to operate the latter to turn the yoke and project the saw into the path of travel of the tubing, a rotatable cam engaging the other arm of the lever and normally holding said lever against the action of its actuating means, means for rotating the cam to release the engaged lever, and a trip-mechanism controlling said cam-rotating means.

22. In a tube-cutting machine, the combination with a movable support having a mandrel journaled therein and a sleeve carrying a saw slidable on said mandrel, of mechanism for moving the support to project the saw into the path of travel of the tubing through the machine, a lever connected at one end with the frame of the machine by a universal joint and engaging at its other end the sleeve carrying the saw, and means for operating said lever to slide the sleeve and saw along the mandrel.

23. In a tube cutting machine, the combination with a movable support having a mandrel journaled therein and a sleeve carrying a saw slidable on said mandrel, of mechanism for moving the support to project the saw into the path of travel of the tubing through the machine, a lever connected at one end with the frame of the machine by a universal joint and engaging at its other end the sleeve carrying the saw, yielding means supporting the weight of the lever, and means for moving said lever to slide the sleeve and saw along the mandrel.

24. In a tube cutting machine, the combination with a pivoted yoke having a mandrel journaled therein and a sleeve carrying a saw slidable on said mandrel, of mechanism for turning the yoke to project the saw into the path of travel of the tubing through the machine, a tubular casing connected by a universal joint with the frame of the machine, a lever engaging at one end the sleeve carrying the saw and longitudinally movable at its other end in the tubular casing, and means for operating said lever to slide the sleeve and saw along the mandrel.

25. In a tube cutting machine, the combination with a pivoted yoke having a mandrel journaled therein and a sleeve carrying a saw slidable on said mandrel, of mechanism for turning the yoke to project the saw into the path of travel of the tubing through the machine, a tubular casing connected by a universal joint with the frame of the machine, a lever engaging at its upper end the sleeve carrying the saw and longitudinally movable at its lower end in the tubular casing, a spring in the tubular casing to support the weight of said lever, and means for operating said lever to slide the sleeve and saw along the mandrel.

26. In a tube cutting machine, the combination with a movable support having a mandrel journaled therein and a sleeve carrying a saw slidable on said mandrel, of mechanism for turning the support to project the saw into the path of travel of the tubing through the machine, a lever connected at one end with the frame of the machine by a universal joint and engaging at its other end the sleeve carrying the saw, and an auxiliary motor yieldingly connected with said lever and operative to move the lever to propel the sleeve and saw along the mandrel in the direction of travel of the tubing.

27. In a tube cutting machine, the combination with a pivoted yoke having a mandrel journaled therein and a sleeve carrying a saw slidable on said mandrel, means for moving the sleeve and saw on the mandrel in the direction of travel of the tubing, means normally operating to move the yoke away from the path of travel of the tubing through the machine, trip-controlled mechanism operative to turn the yoke to project the saw into the path of travel of the tubing, a latch operative to hold the yoke with the saw in its projected position, said latch being released by the saw sleeve when the latter approaches the end of its forward travel on the mandrel, and mechanism controlled by the movement of the yoke for returning the sleeve and saw to their initial positions on the mandrel.

28. In a tube cutting machine, the combination with a pivoted yoke having a mandrel journaled therein and a sleeve carrying saw slidable on said mandrel, a spring connected with said yoke and normally acting to move the yoke away from the path of travel of the tubing, mechanism operative to turn the yoke against the action of said spring to project the saw into the path of travel of the tubing, a latch operative to hold the yoke with the saw in its projected position, a lever connected at one end with the frame of the machine by a universal joint and engaging at its other end the sleeve carrying the saw, an auxiliary motor yieldingly connected with said lever and operative to propel the sleeve and saw along the mandrel in the direction of travel of the tubing, mechanism actuated by the saw sleeve when the latter approaches the end of its travel on the mandrel to move the latch to release the yoke, and spring-actuated mechanism released by the return movement of the yoke for operating said lever to return the sleeve and saw to their initial position on the mandrel.

29. In a tube cutting machine, the combination with a pivoted yoke having a mandrel journaled therein and a sleeve carrying a saw slidable on said mandrel, of means normally operating to turn the yoke away from the path of travel of the tubing through the machine, trip-controlled mechanism operative to turn the yoke and project the saw into the path of travel of the tubing, means independent of the tubing operative to move the sleeve and saw along the mandrel in the direction of travel of the tubing, and mechanism controlled by the movement of the yoke for returning the sleeve and saw to their initial positions on the mandrel.

30. In a tube cutting machine, the combination with a pivoted yoke having a mandrel journaled therein and a sleeve carrying a saw slidable on said mandrel, of means normally operating to turn the yoke away from the path of travel of the tubing through the machine, trip-controlled mechanism operative to turn the yoke and project the saw into the path of travel of the tubing, a lever pivoted to the frame of the machine and engaging the saw sleeve, means for moving the lever to propel the saw along the mandrel in the direction of the travel of the tubing, and mechanism controlled by the movement of the yoke for returning the lever and engaged saw sleeve to their initial positions.

31. In a tube cutting machine, the combination with a pivoted yoke having a mandrel journaled therein and a sleeve carrying a saw slidable on said mandrel, of means normally operating to turn the yoke away from the path of travel of the tubing through the machine, trip-controlled mechanism operative to turn the yoke and project the saw into the path of travel of the tubing, a primary lever pivoted to the frame of the machine and engaging the saw sleeve, means for moving the primary lever to propel the saw sleeve forward along the mandrel in the direction of travel of the tubing, a spring-actuated secondary lever operative to return the primary lever to its initial position, and mechanism operative to move the secondary lever in advance of the primary lever during the forward movement of said primary lever.

32. In a tube cutting machine, the combination with a pivoted yoke having a mandrel journaled therein and a sleeve carrying a saw slidable on said mandrel, of mechanism operative to turn the yoke to project the saw into the path of travel of the tubing, a lever pivoted to the frame of the machine and engaging the saw sleeve, mechanism operative to move the lever and propel the saw sleeve along the mandrel in the direction of the travel of the tubing, and a trip mechanism controlling the operation of both the mechanism for projecting the saw into the path of travel of the tubing and the mechanism for moving the lever.

33. In a tube cutting machine, the combination with a pivoted yoke having a mandrel journaled therein and a sleeve carrying a saw slidable on said mandrel, of mechanism operative to turn the yoke to project the saw into the path of travel of the tubing through the machine, mechanism operative to move the sleeve and saw along the mandrel in the direction of the travel of the tubing, and a trip mechanism controlling the operation of the mechanism for turning the yoke and also controlling the operation of the mechanism for moving the saw along the mandrel.

34. In a tube cutting machine, the combination with a pivoted yoke having a mandrel journaled therein and a sleeve carrying a saw slidable on said mandrel, of means normally operating to turn the yoke away from the path of travel of the tubing through the machine, mechanism operative to turn the yoke to project the saw into the path of travel of the tubing, a primary lever pivoted to the frame of the machine, means for moving forward the primary lever to propel the saw sleeve along the mandrel in the direction of the travel of the tubing, a spring-actuated secondary lever operative to return the primary lever to its initial position, mechanism operative to move the secondary lever in advance of the forward movement of the primary lever, and a catch on said yoke positioned to engage the secondary lever when the latter reaches the limit of its forward movement and when the yoke is in its projected position, the return of the yoke to its normal position operating to release the catch from the secondary lever, the released secondary lever operating through the action of its spring to return the primary lever to its initial position.

35. In a tube cutting machine, the combination with a constantly driven shaft carrying a cam and a clutch operative to transmit motion from the shaft to the cam, of a pivoted yoke having a mandrel journaled therein and a sleeve carrying a saw slidable on said mandrel, mechanism controlled by said cam for turning the yoke to project the saw into the path of travel of the tubing through the machine, and operative means also controlled by said cam for moving the sleeve and saw along the mandrel in the direction of travel of the tubing.

36. In a tube cutting machine, the combination with a constantly driven shaft carrying a cam and a clutch operative to transmit motion from the shaft to the cam, of a pivoted yoke having a mandrel journaled therein and a sleeve carrying a saw slidable on said mandrel, mechanism controlled by said cam for turning the yoke to project the saw into the path of travel of the tubing through the machine, operative means also controlled by said cam for moving the sleeve and saw along the mandrel in the direction of the travel of the tubing, and a trip-actuated mechanism controlling the operation of the clutch.

37. In a tube cutting machine, the combination with a constantly driven shaft carrying a cam and a clutch operative to connect the cam to the shaft, of a pivoted yoke having a mandrel journaled therein and a sleeve carrying a saw slidable on said mandrel, means normally operating the yoke to turn the saw away from the path of travel of the tubing through the machine, mechanism controlled by said cam for turning the yoke to project the saw into the path of travel of the tubing, a primary lever pivoted to the frame of the machine and engaging the saw sleeve, means for moving the lever to advance the saw sleeve on the mandrel, a spring-actuated secondary lever operative to return the primary lever to its initial position, and mechanism actuated by the rotation of said cam for moving the secondary lever against the action of its spring in advance of the primary lever during the forward movement of the latter.

38. In a tube cutting machine, the combination with a constantly driven shaft carrying a cam and a clutch operative to connect the cam to the shaft, of a pivoted yoke having a mandrel journaled therein and a sleeve carrying a saw slidable on said mandrel, means normally operating the yoke to turn the saw away from the path of travel of the tubing, mechanism controlled by said cam for turning the yoke to project the saw into the path of travel of the tubing, a primary lever pivoted to the frame of the machine and engaging the saw sleeve, means for moving the lever to advance the saw sleeve on the mandrel, a spring-actuated secondary lever operative to return the primary lever to its initial position, mechanism actuated by the rotation of said cam for moving the secondary lever against the action of its spring in advance of the primary lever during the forward movement of the latter, and a trip-controlled mechanism for operating the clutch to connect the shaft and cam to rotate the latter.

39. In a tube cutting machine, the combination with a constantly driven shaft carrying a cam and a clutch operative to connect the cam to the shaft, of a pivoted yoke having a mandrel journaled therein and a sleeve carrying a saw slidable on said mandrel, means normally operating the yoke to turn the saw away from the path of travel of the tubing through the machine, mechanism controlled by said cam for turning the yoke to project the saw into the path of travel of the tubing, a primary lever pivoted to the frame of the machine and engaging the saw sleeve, means for moving the lever to advance the saw sleeve on the mandrel, a spring-actuated secondary lever operative to return the primary lever to its initial position, and a bell-crank pivoted to the frame of the machine having one arm connected to the secondary lever and the other arm positioned to be engaged by the cam so that rotation of the latter will turn the bell-crank to move the secondary lever in advance of the forward movement of the primary lever.

40. In a tube cutting machine, means for guiding the tubing into the machine comprising a supporting head adjustable relatively to the axis of operation of the machine, and a series of flexible guides arranged substantially parallel with the path of movement of the tubing and being radially adjustable on said head independently of each other.

41. In a tube cutting machine, means for guiding the tubing into the machine comprising an arm pivoted at one end to the frame of the machine, a head mounted on the other end of the arm and adjustable relatively to the axis of operations of the machine by the angular displacement of the arm, means for holding the arm when angularly displaced, and a series of guides radially adjustable on said head independently of each other.

42. In a tube cutting machine, means for guiding the tubing into the machine comprising a supporting head adjustable relatively to the axis of operations of the machine, a series of flexible guides radially adjustable on said head independently of each other, a table adjustable on the head to receive the tubing from the flexible guides, and a gauge adjustable on the head and cooperating with the table to hold the tubing against the thrust of the cutting action of the saw.

In testimony whereof I affix my signature.

CHAS. R. SEYMOUR.